United States Patent [19]

Tsunemi et al.

[11] Patent Number: 4,504,636
[45] Date of Patent: Mar. 12, 1985

[54] PROCESS FOR PREPARATION OF FORMALDEHYDE COPOLYMERS

[75] Inventors: Kazumasa Tsunemi; Taro Suzuki; Yoshiichi Yamamoto, all of Ube, Japan

[73] Assignee: Ube Industries, Ltd., Yamaguchi, Japan

[21] Appl. No.: 559,199

[22] Filed: Dec. 8, 1983

[30] Foreign Application Priority Data

Dec. 21, 1982 [JP] Japan .................................. 57-222972

[51] Int. Cl.³ ........................ C08G 85/00; C08G 4/00
[52] U.S. Cl. ..................................... 526/67; 528/241; 528/270
[58] Field of Search .................. 526/67; 528/241, 270

[56] References Cited

U.S. PATENT DOCUMENTS

| 3,254,053 | 5/1966 | Fisher et al. | 528/241 |
| 3,442,866 | 5/1969 | Seddon et al. | 528/241 X |
| 4,065,421 | 12/1977 | Allyn et al. | 526/67 X |
| 4,105,637 | 8/1978 | Semanchik et al. | 528/241 |
| 4,197,268 | 4/1980 | Anders | 526/67 X |
| 4,343,929 | 8/1982 | Sugio et al. | 528/241 |

Primary Examiner—Lucille M. Phynes
Attorney, Agent, or Firm—Burgess, Ryan & Wayne

[57] ABSTRACT

A copolymer of formaldehyde with a cyclic formal is continuously prepared by feeding formaldehyde, the cyclic formal and 0.1–20 weight parts, per 100 weight parts of formaldehyde, of an inert organic solvent to a biaxial mixer where the formaldehyde is copolymerized with the cyclic formal in the presence of boron trifluoride or an ether complex thereof.

18 Claims, 4 Drawing Figures

PROCESS FOR PREPARATION OF FORMALDEHYDE COPOLYMERS

BACKGROUND OF THE INVENTION

1. Field of the Invention

This invention relates to a process for the preparation of formaldehyde copolymers.

2. Description of the Prior Art

The process for copolymerizing formaldehyde with a cyclic formal in the gas phase in the presence of boron trifluoride is known (see Japanese Examined Patent Publication No. 43-7554). As is seen in the examples of this patent publication, a copolymer obtained according to this process has a low molecular weight and a poor stability in a basic medium is poor. Accordingly, the copolymer is of little or no practical use.

Japanese Examined Patent Publication No. 44-870 discloses a process in which formaldehyde is copolymerized with a comonomer in the gas phase in the presence of an amine in a rotary reaction vessel. When this process is carried out on an industrial scale, the formed polymer is undesirably deposited onto the wall of the reaction vessel in a short time, and the operation cannot be conducted smoothly.

As means for preventing deposition of the polymer onto the wall of the reaction vessel, there may be considered the use of a self-cleaning type biaxial mixer. As the result of experiments made by us, it has been found that problems arise when formaldehyde is copolymerized with a cyclic formal by using this biaxial mixer. For example, the activity of boron trifluoride or an ether complex thereof used as the catalyst is reduced, the productivity is low, and the stability of the formed copolymer in a basic medium is poor.

SUMMARY OF THE INVENTION

It is a primary object of the present invention to provide a process for the preparation of formaldehyde copolymers, in which the above-mentioned defects are eliminated, namely, by which formaldehyde copolymers having an appropriate molecular weight and a good stibility in a basic medium can be prepared in a high yield and with reduced depositon of the copolymers onto the wall of the reaction vessel.

In accordance with the present invention, there is provided a process for the preparation of formaldehyde copolymers, which comprises continuously feeding formaldehyde, a cyclic formal and 0.1 to 20 parts by weight, per 100 parts by weight of formaldehyde, of an inert organic solvent to a biaxial mixer where formaldehyde is copolymerized with the cyclic formal in the presence of boron trifluoride or an ether complex thereof.

DESCRIPTION OF THE PREFERRED EMBODIMENTS

Figure 1:
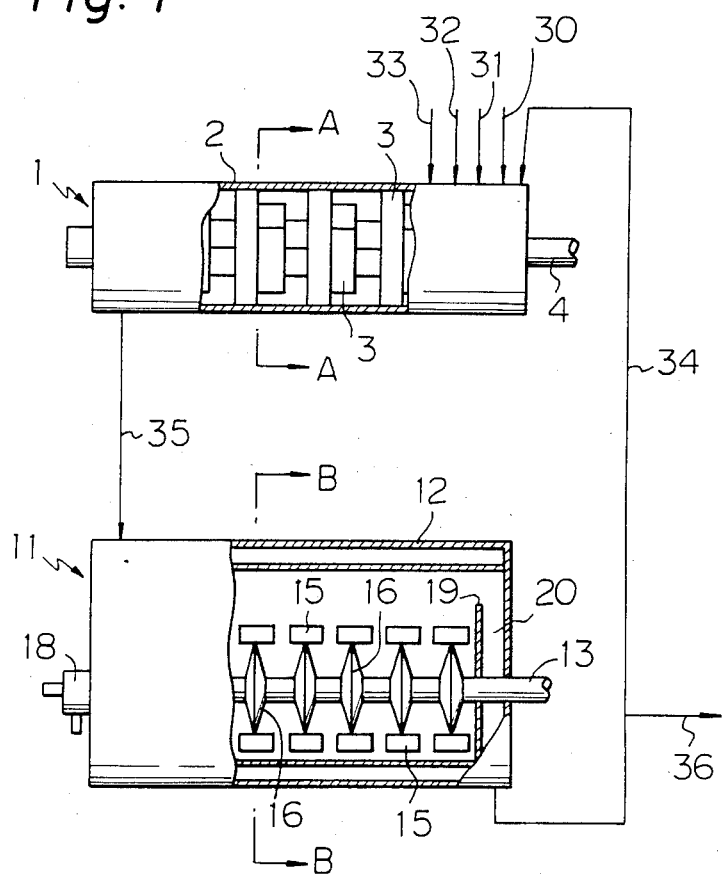
FIG. 1 is a diagram illustrating one embodiment of the arrangement used in the present invention.

It is preferable that formaldehyde used in the present invention has a water content of not more then 0.1% by weight, especially not more than 0.01% by weight. Formaldehyde is subjected to the reaction in the gaseous state.

A compound represented by the following formula:

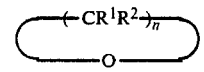

and a compound represented by the following formula:

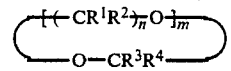

are used as the cyclic formal in the present invention. In the above formulae, $R^1$, $R^2$, $R^3$ and $R^4$ independently stand for a hydrogen atom, an alkyl group preferably having 1 to 8 carbon atoms, an aryl group preferably having 6 to 10 carbon atoms or a cycloalkyl group preferably having 5 to 7 carbon atoms, m is an integer of 1 to 3, and n is an integer of 2 to 6. As specific examples, there can be mentioned ethylene oxide, propylene oxide, butene-1-oxide, 1,3-butadiene-1-oxide, styrene oxide, α-methylstyrene oxide, oxetane, tetrahydrofuran, 1,3-dioxolan, 4-phenyl-1,3-dioxolan, 2-methyl-1,3-dioxolan, 2-phenyl-1,3-dioxolan, 1,3-dioxopan, 2-butyl-1,3-dioxopan, 1,3,6-trioxocan, 1,3,5-trioxopan and polyethylene glycol formal. The amount of the cyclic formal used is preferably 0.001 to 0.1 mole, more preferably 0.01 to 0.04 mole, per mole of the formaldehyde fed. When a cyclic ether which is liquid at normal temperature is used, it is preferable that the cyclic ether be preheated and used for the reaction in the gaseous state.

The biaxial mixer used in the present invention is an apparatus comprising two horizontal stirring shafts each having a plurality of ellipsoidal stirring vanes attached thereto, said stirring shafts being provided in an outer case, so that small clearances are formed between the surfaces of the confronting stirring vanes of the two shafts and between the surfaces of the stirring vanes and the inner wall of the case, when the stirring the shafts are rotated. An example of the commercially available biaxial mixing stirrer of this type is KRC Kneader supplied by Kabushiki Kaisha Kurimoto Tekkosho, Japan.

As specific examples of the inert organic solvent used in the present invention, there can be mentioned aliphatic hydrocarbons such as pentane, hexane and heptane; alicyclic hydrocarbons such as cyclohexane and cyclopentane; aromatic hydrocarbons such as benzen, toluene and xylene; and halogenation products of these hydrocarbons. The amount of the inert organic solvent used is 0.1 to 20 parts by weight, preferably 0.5 to 5 parts by weight, per 100 parts by weight of the formaldehyde fed. If the amount used of the inert organic solvent is smaller than the lower limit, the activity of boron trifluoride or the ether complex thereof is drastically reduced and the stability of the formed copolymer in a basic medium becomes poor. Even if the amount of the inert organic solvent used is larger than the upper limit, the stability of the formed copolymer is not particularly increased and the cost for recovering the inert organic solvent is increased.

As the boron trifluoride ether complex, there can be mentioned a complex of boron trifluoride with an aliphatic ether such as dimethyl ether or diethyl ether. The amount of boron trifluoride or its ether complex is ordinarily $1 \times 10^{-5}$ to $1 \times 10^{-3}$ mole per mole of the formaldehyde fed. When a boron trifluoride ether complex which is liquid at a normal temperature is used, it is preferable that the complex be made gaseous in advance and used for the reaction in the gaseous state.

In the present invention, a metal chelate compound may be used in combination with boron trifluoride or its ether complex. For example, chelate compounds disclosed in Japanese Examined Patent Publications No. 40-7073, No. 42-958, No. 42-7629, No. 42-22068, No. 42-19340 and No. 49-35839 may be used. As typical instances, there can be mentioned chelate compounds comprising a metal such as Cu, Co, Fe, Ni or V as the central atom and a ligand such as a $\beta$-diketone, an aromatic oxyaldehyde or an aromatic oxyaldehyde-diamine condensate. The amount of the metal chelate compound used is preferably not more than 0.5 mole, mor preferably 0.05 to 0.5 mole, per mole of boron trifluoride or its ether complex. If the metal chelate compound is used in combination with boron trifluoride or its ether complex, the stability of the formed copolymer in a basic medium is further improved. The metal chelate compound is used for the reaction in the state where it is dissolved in the inert organic solvent or liquid cyclic formal.

The polymerization heat generated by the copolymerization reaction is removed by a hollow stirring shaft of the biaxial mixer or a cooling jacket. It is preferable that the polymerization heat be removed by an external circulating cooler arranged in a loop for circulating the formed copolymer. Any of known stirring coolers may be used as the external circulating cooler, but it is preferable that a fluid stirring cooler described hereinafter be used. The amount of the copolymer to be supplied to the external circulating cooler may be varied according to the quantity of the polymerization heat to be removed, but ordinarily, the amount of the copolymer supplied to the cooler is 50 to 200 times the amount of formaldehyde fed, based on the weight.

The present invention will now be described with reference to one embodiment illustrated in the accompanying drawings.

Figure 2:
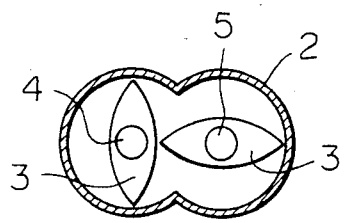
FIG. 2 is a view showing the section taken along the line A—A in FIG. 1.

A biaxial mixer 1 used as the polymerization reaction vessel comprises an outer case 2 and two horizontal stirring shafts 4 and 5 each having a plurality of elliptic mixing stirring vanes 3 attached thereto. As shown in FIG. 2, small clearances of, for example, 0.5 to 5 mm are formed between the surfaces of confronting stirring vanes 3 and between the surface of each mixing stirring vane 3 and the inner wall of the outer case 2, when the stirring shafts 4 and 5 are rotated.

Formaldehyde, a cyclic formal, an inert organic solvent and boron trifluoride or its ether complex are supplied from pipes 30, 31, 32 and 33, respectively. A formaldehyde copolymer (hereinafter referred to as "copolymer") coming from a cooler 11 described hereinafter is supplied from a pipe 34.

The amount of the copolymer circulated and supplied from the pipe 34 is varied according to the quantity of the polymerization heat to be removed in the cooler 11, but ordinarily, the amount of the circulated copolymer is 50 to 200 times the amount of the supplied formaldehyde based on the weight.

In the biaxial mixer 1 where the stirring shafts 4 and 5 and the stirring vanes 3 are driven by motor (not shown), copolymerization of formaldehyde with the cyclic formal is carried out. The polymerization temperature is ordinarily 40° to 80° C. The space velocity of formaldehyde in the stirrer 1 is ordinarily 300 to 2,000 $hr^{-1}$, and the average residence time of the copolymer in the biaxial mixer is ordinarily 5 to 30 seconds.

The formed copolymer is discharged from a pipe 35 together with the circulated copolymer.

A jacket 12 for passing a cooling medium is attached to the cooler 11. Two rotation shafts 13 and 14 are arranged through both the side walls of the cooler 11. It is preferable that the rotation shafts 13 and 14 be arranged in parallel to each other. It also is preferable that the space between the rotation shafts 13 and 14 be such that the loci (rotary circles) of the tops of stirring vanes 15 described hereinafter are close to one another or overlapped one another. Incidentally, although at least 3 rotation shafts may be arranged, from the practical viewpoint, two rotation shafts are sufficient because the mixing efficiency is not substantially different.

Figure 4:
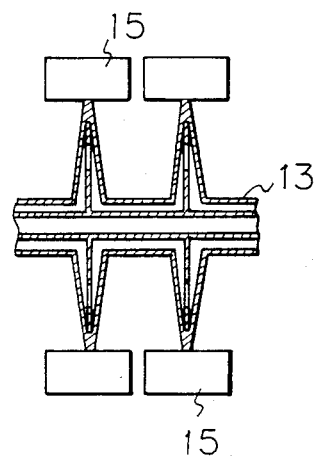
FIG. 4 is an enlarged sectional view showing a cooling member.

Disc-like cooling members 16 and 17 are attached to the rotation shafts 13 and 14, respectively. The rotation shafts 13 and 14 and the cooling members 16 and 17 have a structure such that a fluid is allowed to pass through the interiors of these shafts and cooling members, as shown in FIG. 4. A rotary joint 18 is attached to one end of each the rotation shafts 13 and 14 to supply and discharge a cooling medium to and from the rotation shaft 13 or 14 and the cooling member 16 or 17. The size and number of the cooling members 16 and 17 may be appropriately determined by those skilled in the art while the quantity of the polymerization heat to be removed is taken into account.

The stirring vanes 15 are attached in contiguity to outermost circumferences of the cooling members 16 and 17. The shape of the stirring vane 15 is not particularly critical, but in order to produce a circulating flow of the powdery copolymer in the cooler 11, it is preferable that plate-like stirring vanes be arranged in parallel to the rotation shafts 13 and 14. In order to promote the movement of the powdery copolymer in the direction of the rotation shaft of the cooler 11, the stirring vanes may be inclined to the axial direction, or parallel vanes and inclined vanes may be used in combination. A plurality of stirring vanes are symmetrically arranged, and three or four vanes may be adopted but two stirring vanes are ordinarily sufficient. The stirring vanes 15 are attached so that they do not fall in contact with each other on rotation. If the ratio of the width of the stirring vane 15 to the rotation radius of the stirring vane 15 is large, the radius of the cooling members 16 and 17 is small and the heat transfer area is reduced. Accordingly, it is preferable that the width of the stirring vane 15 be small, so far as a circulating flow of the powdery copolymer is formed.

The bottom wall of the cooler 11 is constructed by a partial cylinder having a shape determined by the locus of the peripheral and of the stirring vane 15. The maximum limit of the partial cylinder is a ½ cylinder. Namely, in the case where the loci of the peripheral ends of the stirring vanes 15 are separate, in order to prevent stagnation of the powder in the lower portion of the cooler 11, it is preferable that a connecting portion having a mountain-like cross-section be formed in the intermediate part between the locus of the peripheral end of the stirring vane and on the bottom wall of the cooler 11. It is preferable that the distance between the bottom wall of the cooler 11 and the peripheral end of the stirring vane 15 be as small as possible, and ordinarily, this distance is smaller than 10 mm.

Figure 3:
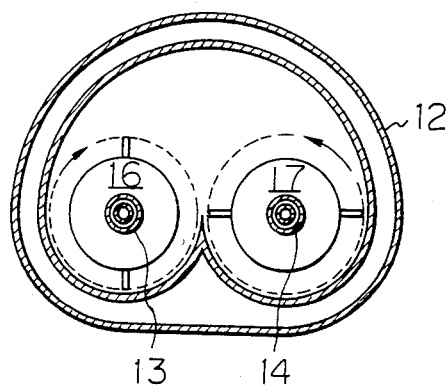
FIG. 3 is a view showing the section taken along the line B—B in FIG. 1.

The upper inner wall of the cooler 11 has an arcuate shape as shown in FIG. 3. It is especially preferable that the upper half portion of the cooler 11 be constructed by a partial cylinder having a diameter equal to the distance between the horizontal lines passing through the centers of the rotation shafts 13 and 14, respectively.

A dam 19 is formed on one side wall of the cooler 11 and a copolymer discharge nozzle 20 is constructed contiguously to the dam 19. The copolymer discharge apparatus is not limited to one illustrated in FIG. 1. For example, a discharge nozzle piercing through the jacket 12 may be constructed in the bottom portion of the cooler 11.

The length of the cooler 11 in the axial direction is optional, but it is preferable that this length be 1 to 7 times, more preferably 1.5 to 5 times, the diameter of the rotary circle of the stirring vane 15. It is preferable that the cooler 11 be horizontally arranged, but in order to promote the movement of the powdery copolymer in the axial direction, it is preferable that the cooler 11 be inclined within 10° from the horizontal plane.

The copolymer is supplied from the reaction vessel, that is, the biaxial mixer 1, through a pipe 35 to the cooler 11. The rotation shafts 13 and 14 are rotated at equal speeds by a driving device (not shown). The rotation direction of the rotation shafts 13 and 14 is not particularly critical, but from the viewpoint of the uniformity of stirring, it is preferable that the shafts be rotated in opposite directions. It is more preferable that, as shown in FIG. 3, the rotation shaft 13 be rotated in the clockwise direction and the rotation shaft 14 be rotated in the counterclockwise direction. It also is preferable that the rotation speed of the rotation shafts 13 and 14 be such that the speed of the peripheral end of each stirring vane 15 be 1 to 5 m/sec.

The amount of the powdery copolymer in the cooler 11 is not particularly critical, so far as a sufficient stirring effect can be obtained. However, it is preferable that the amount of the powdery copolymer in the cooler 11 be such that in the state where the stirring vane 15 is stopped, the level of the powdery copolymer is the same as or lower than the highest point of the locus of the stirring vane 15.

In the cooler 11, the powdery copolymer is scraped up by the stirring vanes 15 to form a forced circulation flow.

The polymerization heat is removed by a cooling medium passed through the jacket 12 and a cooling medium supplied to the cooling members 16 and 17 from the rotary joints 18. In the cooler 11, the powdery copolymer impinges violently against the entire cooling members 16 and 17, and since the heat transfer surface per se is rotated, the slip force of the powder is increased and the heat transfer surface falls in uniform contact with the fluid. Accordingly, deposition of the powdery copolymer onto the heat transfer surface can be reduced and the heat transfer surface can be sufficiently renewed, and by disturbance of the interfacial boundary, the heat transfer coefficient can be increased. Therefore, the polymerization heat can be removed at a high efficiency.

The cooled powdery copolymer is discharged from the pipe 34. The copolymer in an amount corresponding to the amount of the formed copolymer is withdrawn from the pipe 36 as a product, while the remaining copolymer is returned to the first step through the pipe 34.

Forced transfer pipes such as screw conveyors are preferably used as the powdery copolymer transfer pipes 34, 35 and 36.

As means for removing the polymerization heat, the above-mentioned method wherein the polymerization heat is removed through the heat transfer surface and the method wherein a cooled inert gas is passed through the interior of the cooler may be utilized in combination. There can also be adopted a method in which an inert low-boiling-point hydrocarbon is supplied into the cooler 11 where the polymerization heat is removed by the vaporization heat of the hydrocarbon.

The present invention will now be described in detail with reference to the following examples and comparative examples.

The intrinsic viscosities of formaldehyde copolymers were measured at 60° by using p-chlorophenol containing 2% by weight of α-pinene. The base stability of a formaldehyde copolymer means a recovery ratio (%) of the copolymer obtained when the copolymer was heat-treated in benzyl alcohol containing 1% by weight of tri-n-butylamine at a copolymer concentration of 10% by weight at 160° C. for 1 hour.

EXAMPLE 1

KRC kneader #4 provided with a hopper (supplied by Kabushiki Kaisha Kurimoto Tekkosho, Japan) was used as a polymerization reaction vessel, and Paddle Drier NPD-1.6W (supplied by Kabushiki Kaisha Nara Kikai Seisakusho, Japan) was used as an external circulating cooler. Screw conveyors were used as pipes connecting the kneader to the drier and withdrawing a formed copolymer from the hopper.

Copolymerization of formaldehyde (hereinafter referred to as "FA") with 1,3,6-trioxocan (hereinafter referred to as "TOC") was continuously carried out by using the above-mentioned devices.

About 50 kg of a copolymer of FA with TOC was charged in the drier and circulated at a rate of 600 kg/hr. Gaseous FA having a water content of 50 to 80 ppm, gaseous TOC, toluene and gaseous boron trifluoride were supplied at rates of 6 kg/hr, 480 g/hr, 142 g/hr and 18.0 millimoles/hr, respectively, from an introduction opening formed downstream of the hopper. The amounts of cooling water introduced into the kneader and the jacket of the drier were adjusted so that the temperature of the copolymer at the outlet of the kneader was maintained at 60° C. The formed copolymer was withdrawn from the overflow line of the hopper, and the boron trifluoride used was deactivated by gaseous ammonia. This continuous copolymerization was conducted for 240 hours.

The intrinsic viscosity of the formed copolymer was 1.6, the base stability of the formed copolymer was 90%, and the one-pass yield of the copolymer based on FA was 99%. The TOC unit content in the copolymer was 2.0 mole %.

EXAMPLE 2

The procedures of Example 1 were repeated in the same manner except that the feed rate of gaseous TOC was changed to 390 g/hr and liquid TOC containing 21.4 μmole/g of bis(acetylacetone) copper dissolved therein was additionally supplied at a rate of 90 g/hr.

The intrinsic viscosity of the formed copolymer was 1.7, the base stability of the formed copolymer was 92%, and the one-pass yield based on FA was 99%. The TOC unit content in the copolymer was 2.0 mole %.

COMPARATIVE EXAMPLE 1

The procedures of Example 1 were repeated in the same manner except that toluene was not supplied.

The intrinsic viscosity of the formed copolymer was 1.7, the base stability was 81%, and the one-pass yield based on FA was 95%.

EXAMPLE 3

KRC kneader #4 provided with a hopper (supplied by Kabushiki Kaisha Kurimoto Tekkosho) was used as a polymerization reaction vessel, and a cooler of SUS 304 having an inner capacity of 200 liters, which had a shape as shown in FIGS. 1, 3 and 4 and had a height of 435 mm, a width of 560 mm and a length of 1,150 mm, was used. Two rotation shafts were provided in parallel in the cooler, and ten cooling members of SUS 304 having an outer diameter of 200 mm (shown in FIG. 4) were attached to each rotation shaft at intervals of 95 mm. Two stirring vanes were attached to the outer circumference of each cooling member at positions opposed to each other. Screw conveyors were used as the pipes connecting the polymerization reaction vessel to the cooler and withdrawing the formed copolymer from the hopper. Copolymerization of FA with TOC was continuously carried out by using the above-mentioned apparatus.

About 50 kg of a copolymer of FA with TOC was charged in the apparatus and circulated at a rate of 600 kg/hr. Gaseous FA having a water content of 50 to 80 ppm, gaseous TOC, toluene and gaseous boron trifluoride were supplied at rates of 6 kg/hr, 480 g/hr, 142 g/hr and 18 millimoles/hr, respectively, from an introduction opening formed downstream of the hopper. The amounts of cooling water introduced into the jacket of the cooler and the cooling members were adjusted so that the temperature of the copolymer at the outlet of the kneader was maintained at 60° C. The formed copolymer was withdrawn from the overflow line of the hopper and brought into contact with gaseous ammonia to deactivate the boron trifluoride used. This continuous copolymerization was conducted for 240 hours.

The intrinsic viscosity of the formed copolymer was 1.6, the base stability of the formed copolymer was 90%, and the one-pass yield of the copolymer based on FA was 99%. The TOC unit content in the copolymer was 2.0 mole %.

EXAMPLE 4

The procedures of Example 3 were repeated in the same manner except that the feed rate of gaseous TOC was changed to 390 g/hr and liquid TOC containing 21.4 μmole/g of bis(acetylacetone) copper dissolved therein was additionally supplied at a rate of 90 g/hr.

The intrinsic viscosity of the formed copolymer was 1.7, the base stability of the formed copolymer was 92%, and the one-pass yield of the copolymer based on FA was 99%. The TOC unit content in the copolymer was 2.0 mole %.

We claim:

1. A process for the preparation of formaldehyde copolymers, which comprises continuously feeding formaldehyde, a cyclic formal and 0.1 to 20 parts by weight, per 100 parts by weight of formaldehyde, of an inert organic solvent to a biaxial mixer where the formaldehyde is copolymerized with the cyclic formal in the presence of boron trifluoride or an ether complex thereof.

2. A process according to claim 1, wherein the formaldehyde fed to the biaxial mixer has a water content of not more than 0.1% by weight and is subjected to the copolymerization in the gaseous state.

3. A process according to claim 1, wherein the cyclic formal is selected from the group consisting of:
(a) a compound represented by the formula:

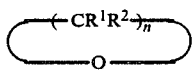

wherein $R^1$ and $R^2$ independently stand for a hydrogen atom, an alkyl group, an aryl group or a cycloalkyl group, and (b) a compound represented by the formula:

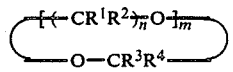

wherein $R^1$, $R^2$, $R^3$ and $R^4$ independently stand for a hydrogen atom, an alkyl group, an aryl group or a cycloalkyl group.

4. A process according to claim 1, wherein the amount of the cyclic formal is in the range of from 0.001 to 0.1 mole per mole of the formaldehyde.

5. A process according to claim 1, wherein the cyclic formal is subjected to the copolymerization in the gaseous state.

6. A process according to claim 1, wherein the inert organic solvent is selected from the group consisting of aliphatic hydrocarbons, alicyclic hydrocarbons, aromatic hydrocarbons, and halogenation products of these hydrocarbons.

7. A process according to claim 1, wherein the amount of the inert organic solvent is in the range of from 0.5 to 5 parts by weight per 100 parts by weight of the formaldehyde fed.

8. A process according to claim 1, wherein the ether complex is a complex of boron trifluoride with an aliphatic ether.

9. A process according to claim 1, wherein the amount of the boron trifluoride or the ether complex thereof is in the range of from $1 \times 10^{-5}$ to $1 \times 10^{-3}$ mole per mole of the formaldehyde fed.

10. A process according to claim 1, wherein the boron trifluoride or the ether complex thereof is used in combination with a metal chelate compound.

11. A process according to claim 10, wherein the metal chelate compound is a chelate compound comprising Cu, Co, Fe, Ni or V as the central atom and a β-diketone, an aromatic oxyaldehyde or an aromatic oxyaldehyde-diamine condensate as the ligand.

12. A process according to claim 10, wherein the amount of the metal chelate compound is not more than 0.5 mole per mole of the boron trifluoride or the ether complex thereof.

13. A process according to claim 1, wherein said biaxial mixer comprises an outer case and two horizontal stirring shafts provided in the outer case, each shaft having a plurality of elliptic mixing stirring vanes attached thereto so that a clearance of 0.5 to 5 mm is formed between the surfaces of confronting stirring vanes and between the surface of each mixing stirring vane and the inner wall of the outer case.

14. A process according to claim 1, wherein the copolymerization of formaldehyde is carried out at a temperature of 40° to 80° C.

15. A process according to claim 1, wherein the space velocity of formaldehyde in the biaxial mixer is in the range of from 300 to 2,000 $hr^{-1}$.

16. A process according to claim 1, wherein the average residence time of the copolymer produced in the biaxial mixer is in the range of from 5 to 30 seconds.

17. A process according to claim 1, wherein the copolymerizatin of formaldehyde is carried out by using an arrangement comprising the biaxial mixer and a cooler, while the copolymer produced is continuously circulated from the biaxial mixer to the cooler and a part of the copolymer cooled in the cooler and withdrawn therefrom is continuously circulated into the biaxial mixer.

18. A process according to claim 17, wherein the amount of the copolymer circulated from the biaxial mixer to the cooler is 50 to 200 times the amount of the formaldehyde fed into the biaxial mixer.

* * * * *